(12) United States Patent
Han et al.

(10) Patent No.: US 8,302,155 B2
(45) Date of Patent: Oct. 30, 2012

(54) UPNP APPARATUS AND METHOD FOR PROVIDING REMOTE ACCESS SERVICE

(75) Inventors: Sehee Han, Seoul (KR); Seongho Cho, Seoul (KR); Sanghyeon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 921 days.

(21) Appl. No.: 12/358,685

(22) Filed: Jan. 23, 2009

(65) Prior Publication Data

US 2009/0240815 A1 Sep. 24, 2009

Related U.S. Application Data

(60) Provisional application No. 61/038,113, filed on Mar. 20, 2008.

(30) Foreign Application Priority Data

Aug. 27, 2008 (KR) .................. 10-2008-0084049

(51) Int. Cl.
*H04L 29/06* (2006.01)

(52) U.S. Cl. ............................. 726/2; 713/185; 370/338

(58) Field of Classification Search ....... 726/2; 713/185; 370/338

See application file for complete search history.

(56) References Cited

U.S. PATENT DOCUMENTS

2006/0114872 A1* 6/2006 Hamada ................. 370/338
2007/0208948 A1* 9/2007 Costa-Requena et al. .... 713/185

* cited by examiner

*Primary Examiner* — Jeffrey Pwu
*Assistant Examiner* — Thong Truong
(74) *Attorney, Agent, or Firm* — Sughrue Mion, PLLC

(57) ABSTRACT

A universal plug and play (UPnP) device and method of providing a remote access service, the method including: receiving product identification number (PIN) information that is an identifier provided to a remote access server (RAS) device when manufactured and a uniform resource locator (URL) of the RAS device from the outside; generating WPS messages including a credential ID and remote access transport agent (RATA) capability information, which are generated based on the PIN information; encapsulating an extensible authentication protocol (EAP) packet including the WPS messages as an IP based application protocol packet; and transmitting the IP based application protocol packet to the RAS device.

17 Claims, 5 Drawing Sheets

UPNP APPARATUS AND METHOD FOR PROVIDING REMOTE ACCESS SERVICE

CROSS-REFERENCE TO RELATED APPLICATIONS

This application claims the benefit of U.S. Provisional Application No. 61/038,113 filed on Mar. 20, 2008 in the USPTO and Korean Patent Application No. 10-2008-0084049, filed on Aug. 27, 2008, in the Korean Intellectual Property Office, the disclosures of which are incorporated herein in their entirety by reference.

BACKGROUND

1. Field

One or more embodiments of the present invention relate to a service for easily setting up channel setup information (a remote access transport agent (RATA) profile) for remote access. More specifically, the present invention relates to a universal plug and play (UPnP) apparatus and method for providing a remote access service by inputting product identification number (PIN) information about a UPnP remote access server (RAS) device, receiving channel setup information (a RATA profile) for remote access using a WiFi protected setup (WPS) protocol, and remotely accessing the UPnP RAS device.

2. Description of the Related Art

According to the popularity of home networks, a conventional PC network-oriented environment increasingly extends to an environment including home appliances using various lower network techniques. Therefore, a home network middleware technology, such as universal plug and play (UPnP), has been proposed in order to network these home appliances in a unified manner by using an IP protocol.

The UPnP technology enables home appliances to be peer-to-peer networked on the basis of a distributed and open networking structure instead of being under centralized control.

With regard to home network middleware, in general, a UPnP device models its service as an action and a state variable, and a UPnP control point (CP) automatically discovers the UPnP device to use its service.

The UPnP device architecture version 1.0 uses distributed and open networking to discover a UPnP device via an IP multicast in the home network. However, an IP multicast service is not guaranteed to be normally provided within the range of the Internet, making it impossible to control the UPnP device via the Internet since such control of the UPnP device needs information obtained by discovering the UPnP device.

Therefore, when the UPnP device or a CP device is physically separated and far from the home network, UPnP remote access architecture has been proposed so as to allow the UPnP device or the CP device to operate normally as if both were physically in the same network. The UPnP remote access architecture defines a remote access server (RAS) device within the home network and a remote access client (RAC) device within a remote network.

SUMMARY

One or more embodiments of the present invention include a universal plug and play (UPnP) apparatus and method for providing a remote access service by easily setting up channel setup information (a remote access transport agent (RATA) profile) for remote access.

Additional aspects will be set forth in part in the description which follows and, in part, will be apparent from the description, or may be learned by practice of the invention.

To achieve the above and/or other aspects, one or more embodiments of the present invention may include a communication method of a universal plug and play (UPnP) remote access client (RAC) device for providing a remote access service, the method comprising: receiving product identification number (PIN) information that is an identifier provided to a remote access server (RAS) device when manufactured and a uniform resource locator (URL) of the RAS device from the outside; generating WPS messages including a credential ID and remote access transport agent (RATA) capability information, which are generated based on the PIN information; encapsulating an extensible authentication protocol (EAP) packet including the WPS messages as an IP based application protocol packet; and transmitting the IP based application protocol packet to the RAS device.

The method may further comprise receiving the IP based application protocol packet including RATA profiles for remote access; decapsulating the received IP based application protocol packet as the EAP packet; extracting the WPS messages including the RATA profiles for the remote access from the EAP packet; and establishing the RATA profiles for the remote access in the RAS device.

The IP based application protocol may be a remote authentication dial-in user service (RADIUS) protocol.

The method may further comprise: generating a credential by using the PIN information; and determining a credential ID of the generated credential.

To achieve the above and/or other aspects, one or more embodiments of the present invention may include a communication method of a UPnP RAS device for providing a remote access service, the method comprising: receiving an IP based application protocol packet including a credential ID and RATA capability information from a RAC device; decapsulating the received IP based application protocol packet as an EAP packet; extracting WPS messages including the credential ID and the RATA capability information from the EAP packet; and transmitting the credential ID and the RATA capability information to a management console device that subscribes to an event in advance.

The method may further comprise: receiving RATA profiles with regard to the RAC device and the RAS device from the management console device; and establishing the RATA profiles with regard to the RAS device in the RAS device.

The method may further comprise: generating WPS messages including the RATA profile with regard to the RAC device; encapsulating the EAP packet including the WPS messages as the IP based application protocol packet; and transmitting the IP based application protocol packet to the RAC device.

The IP based application protocol may be a RADIUS protocol.

To achieve the above and/or other aspects, one or more embodiments of the present invention may include a communication method of a management console device for providing a remote access service, the method comprising: receiving a credential ID and RATA capability information of a RAC device from a RAS device that subscribes to an event in advance; generating RATA profiles with regard to the RAC device and the RAS device; and transmitting the RATA profiles with regard to the RAC device and the RAS device to the RAS device.

The management console device may be separated from or is included in the RAS device.

To achieve the above and/or other aspects, one or more embodiments of the present invention may include a computer-readable recording medium having recorded thereon a computer program for executing the method.

To achieve the above and/or other aspects, one or more embodiments of the present invention may include a UPnP RAC device for providing a remote access service, the device comprising: a user interface unit receiving PIN information that is an identifier provided to a RAS device when manufactured and a URL of the RAS device from the outside; a WPS message generation unit generating WPS messages including a credential ID and RATA capability information, which are generated based on the PIN information; a protocol encapsulation unit encapsulating an EAP packet including the WPS messages as an IP based application protocol packet; and a transmission unit transmitting the IP based application protocol packet to the RAS device.

To achieve the above and/or other aspects, one or more embodiments of the present invention may include a UPnP RAS device for providing a remote access service, the device comprising: a reception unit receiving an IP based application protocol packet including a credential ID and RATA capability information from a RAC device; a protocol decapsulation unit decapsulating the received IP based application protocol packet as an EAP packet; a WPS message extraction unit extracting WPS messages including the credential ID and the RATA capability information from the EAP packet; and a management console device transmission interface unit transmitting the credential ID and the RATA capability information to a management console device that subscribes to an event in advance.

To achieve the above and/or other aspects, one or more embodiments of the present invention may include a management console device for providing a remote access service, the device comprising: a reception unit receiving a credential ID and RATA capability information of a RAC device from a RAS device that subscribes to an event in advance; a RATA profile generation unit generating RATA profiles with regard to the RAC device and the RAS device; and a transmission unit transmitting the RATA profiles with regard to the RAC device and the RAS device to the RAS device.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE EMBODIMENTS

Figure 1:
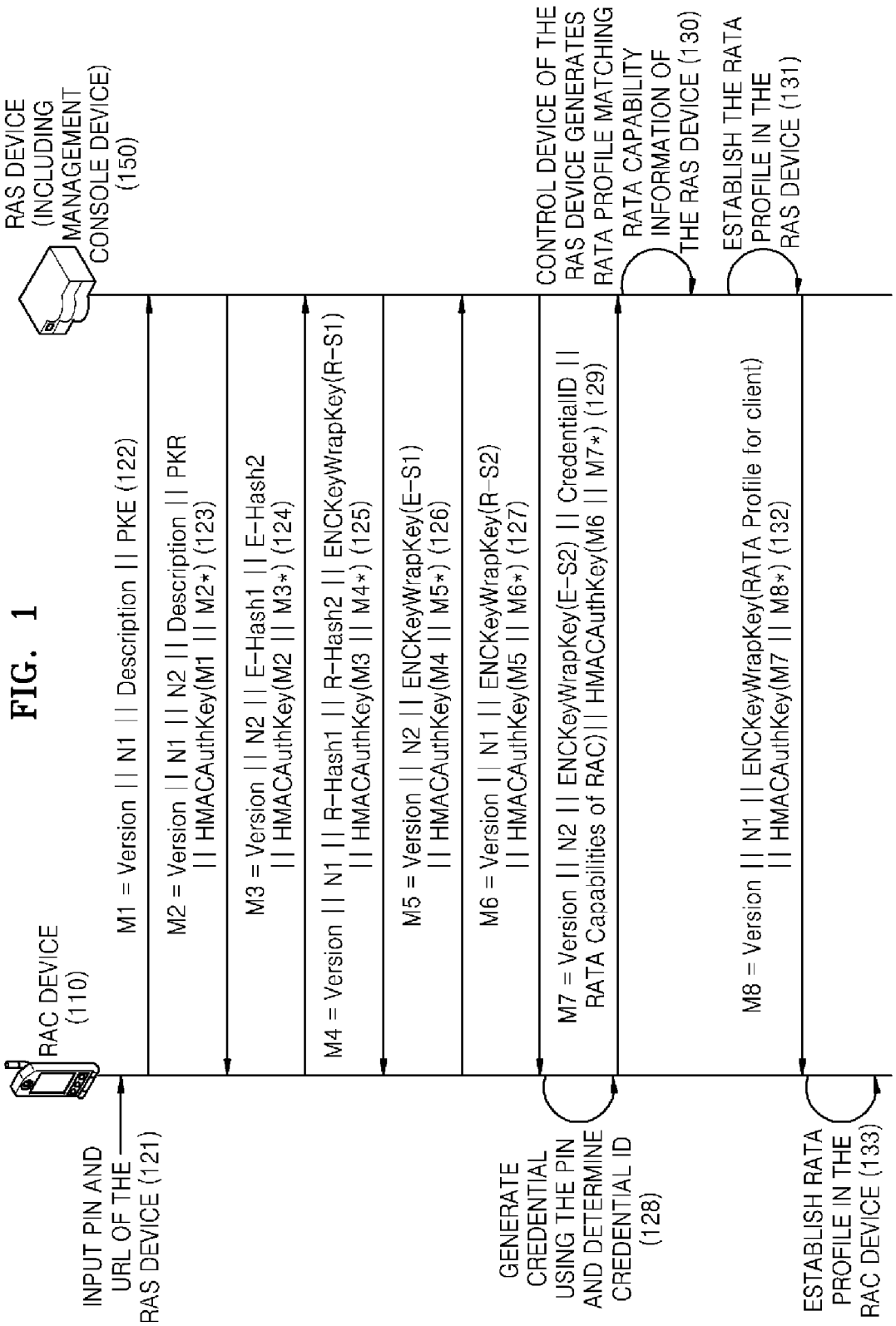
FIG. 1 illustrates a process for setting up a remote access transport agent (RATA) profile in a remote access client (RAC) device of a remote network and a remote access server (RAS) device of a home network including a management console device according to an embodiment of the present invention.

Reference will now be made in detail to embodiments, examples of which are illustrated in the accompanying drawings, wherein like reference numerals refer to the like elements throughout. In this regard, the present invention may be embodied in many different forms and should not be construed as being limited to the embodiments set forth herein. Accordingly, embodiments are merely described below, by referring to the figures, to explain aspects of the present invention.

FIG. 1 illustrates a process for setting up a remote access transport agent (RATA) profile in a remote access client (RAC) device 110 of a remote network and a remote access server (RAS) device 150 of a home network including a management console device according to an embodiment of the present invention. Referring to FIG. 1, the RAS device 150 is a UPnP device within the home network. The RAC device 110 is a UPnP device within the remote network. The RAS device 150, which is a logical device for supporting the remote access service, may physically be the same as or different from an Internet gateway device (IGD). The management console device, which is a device for setting up configuration information relating to remote access and controlling a remote access service, corresponds to a UPnP control point (CP) for controlling the remote access service. The management console device of the present embodiment is included in the RAS device 150. A new UPnP action and state variables may be defined in the RAS device 150, the RAC device 110, and the management console device.

The RAS device 150 and the RAC device 110 synchronize device list information discovered in each network over a remote access transport channel (RATC) established therebetween, so that the RAC device 110 of the remote network can discover UPnP devices of the home network. Thereafter, the RAS device 150 of the home network forwards a device control message received from the RAC device 110 of the remote network to a corresponding UPnP device over the RATC.

The management console device provides parameters necessary for establishing the RATC between the RAS device 150 and the RAC device 110 in the form of a remote access transport agent (RATA) profile. The management console device matches a plurality of protocols and pieces of capability information that are to be used by RATAs of the RAS device 150 and the RAC device 110, and generates each RATA profile with regard to the RAS device 150 and the RAC device 110 based on the matching information. The RAS device 150 and the RAC device 110 establish their own RATA profiles within themselves, so that the RATC can be established between the RAS device 150 and the RAC device 110. When the RAS device 150 and the RAC device 110 are within the same network, the RATA profile may be dynamically established according to the UPnP device architecture version 1.0.

In the present embodiment, when the RAC device 110 that does not establish the RATA profile is within the remote network, the RAC device 110 receives and establishes the RATA profile from the RAS device 150 of the home network including the management console device.

In operation 121, the RAC device 110 receives product identification number (PIN) information that is an identifier provided to the RAS device 150 when manufactured and a uniform resource locator (URL) of the RAS device 150 from the outside. An RAS operates as a dynamic domain name system (DNS) client and thus the RAC device 110 may receive a domain name of the RAS device 150 form the outside instead of receiving an IP address of the RAS device 150.

In operations 122 through 127, 129, and 131, the RAC device 110 and the RAS device 150 authenticate each other by exchanging WiFi protected setup (WPS) messages (M1 through M8). The WPS messages M1 through M6 follow the Wi-Fi simple config specification. The WPS messages M1 through M8 are defined in the specification and thus a detailed description thereof will not be repeated here.

In operations 122 and 123, the RAC device 110 transmits the WPS message M1 and receives the WPS message M2 from the RAS device 150 to exchange and authenticate a public key therebetween and generate a temporal encryption key.

In operations 124 through 127 and 129, the RAC device 110 and the RAS device 150 exchange hash values E-Hash1, E-Hash2, R-Hash1, and R-Hash2 that are generated using PIN values and random values E-S1, E-S2, R-S1, and R-S2, and authenticate whether the PIN values are identical to each other (the WPS messages M1 through M7), enabling the RAC device 110 and the RAS device 150 to authenticate each other.

In operation 128, the RAC device 110 generates a credential and a credential ID using the PIN information. The credential establishes the identity of the RAC device 110 in the form of the cryptographic key issued by the PIN information. The management console device needs the RATA capability information and the credential ID of the RAC device 110 so as to generate the RATA profile. Thus, the RAC device 110 generates the credential using the PIN information and the credential ID with regard to the generated credential.

In operation 129, the RAC device 110 generates the WPS message M7 including the credential ID and the RATA capability information and transmits the WPS message M7 to the RAS device 150.

In operation 130, the management console device included in the RAS device 150 receives the credential ID and the RATA capability information of the RAC device 110. The management console device matches the protocols and capability information that are to be used by RATAs of the RAS device 150 and the RAC device 110, and generates each RATA profile with regard to the RAS device 150 and the RAC device 110 based on the matching information.

In operation 131, the RAS device 150 establishes the RATA profile therein.

In operation 132, the RAC device 110 receives the WPS message M8 including the RATA profile with regard to the RAC device 110 from the RAS device 150.

In operation 133, the RAC device 110 establishes the RATA profile therein and establishes the RATC between the RAS device 150 and the RAC device 110 using the RATA profile.

In the present embodiment, the RATA profile may be dynamically provided to the RAC device 110 of the remote network that does not establish the RATA profile in advance in the home network including the RAS device 150 including the management console device. Therefore, the RAC device 110 receives only the PIN information and URL information of the RAS device 150 from the outside, thereby enabling an easy remote access channel setup.

Also, in the present embodiment, a WPS protocol that is used in the same physical network is extended to an IP layer protocol (for example, a remote authentication dial-in user service (RADIUS), so that devices of physically different networks can use the WPS protocol.

Figure 2:
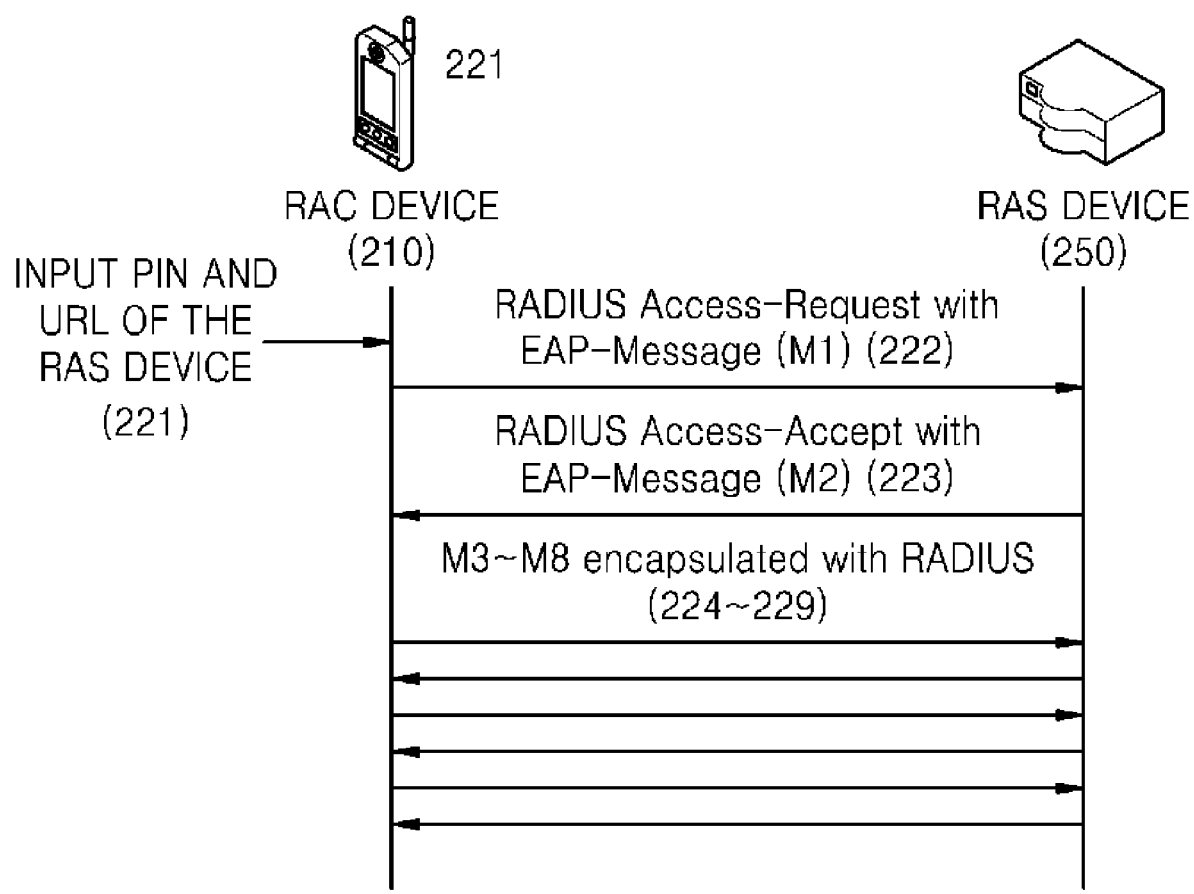
FIG. 2 illustrates a process of transmitting an extensible authentication protocol (EAP) packet including WiFi protected setup (WPS) messages that are encapsulated as a remote authentication dial-in user service (RADIUS) protocol packet according to an embodiment of the present invention.

FIG. 2 illustrates a process of transmitting an extensible authentication protocol (EAP) packet including the WPS messages that are encapsulated in a RADIUS protocol packet according to an embodiment of the present invention. Referring to FIG. 2, when an RAC device 210 and an RAS device 250 are in the same physical network, the RAC device 210 and the RAS device 250 exchange the WPS messages M1 through M8 in the form of an EAP packet. However, since the RAC device 210 is in a remote network away from the home network physically including the RAS device 250, the EAP packet operating in a lower layer of an IP protocol is transmitted after being encapsulated in an IP based application protocol packet. In the present embodiment, the RADIUS protocol is used as the IP based application protocol.

In operations 222 through 229, EAP packets including the WPS messages M1 through M8 are encapsulated in the RADIUS packets and are transmitted/received between the RAC device 210 and the RAS device 250.

Figure 3:
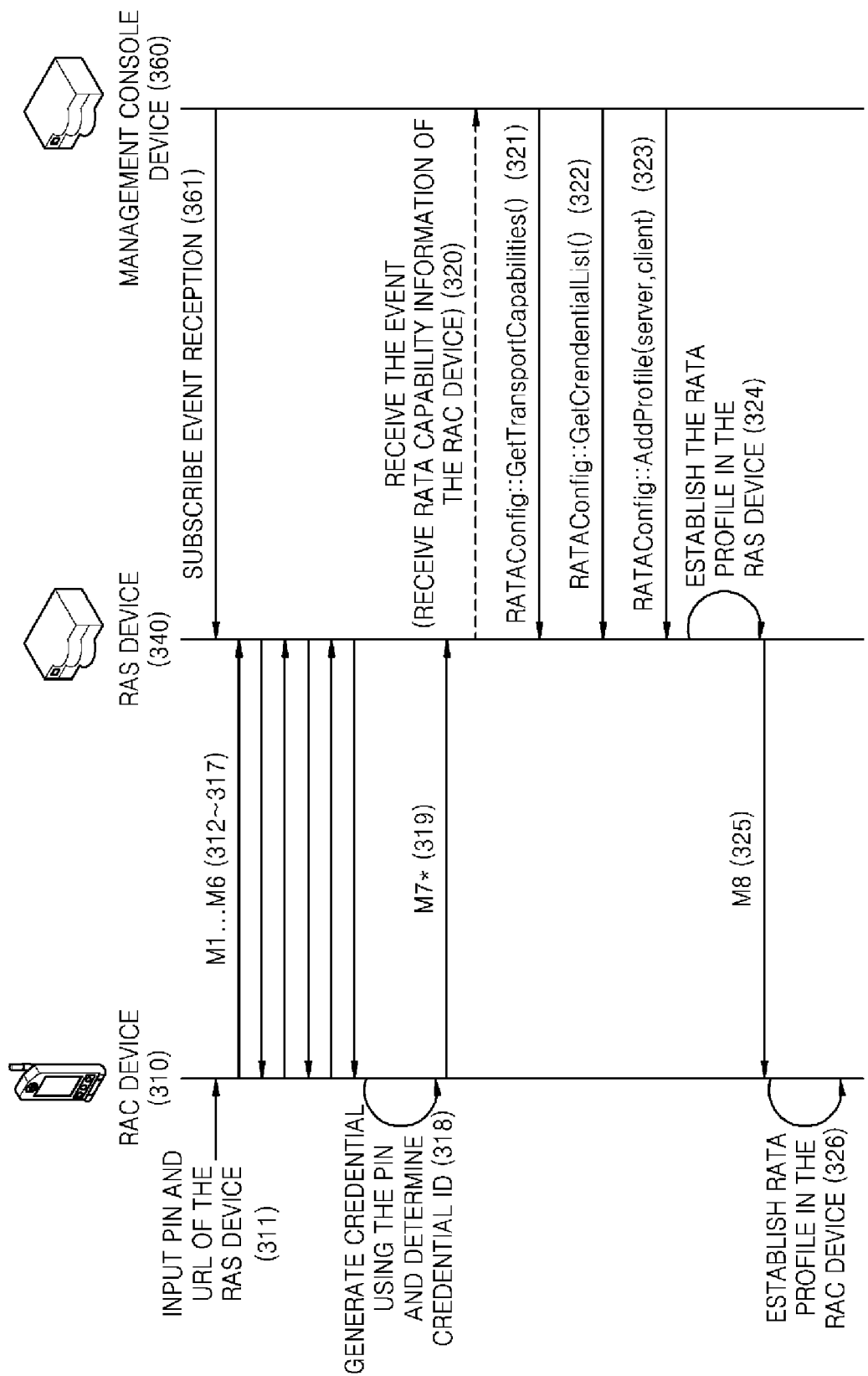
FIG. 3 illustrates a process for setting up a RATA profile in a RAC device of a remote network and a RAS device of a home network via a separate management console device according to another embodiment of the present invention.

FIG. 3 illustrates a process for setting up a RATA profile in a RAC device 310 of a remote network and a RAS device 340 of a home network via a separate management console device 360 according to another embodiment of the present invention. Referring to FIG. 3, in operation 311, the RAC device 310 receives PIN information and an URL of the RAS device 340 from the outside.

In operations 312 through 317, 319, and 324, the RAC device 310 and the RAS device 340 authenticate each other by exchanging the WPS messages M1 through M8. The WPS messages M1 through M6 follow the Wi-Fi simple config specification. The WPS messages M1 through M8 are defined in the specification and thus a detailed description thereof will not be repeated here.

In operations 312 and 313, the RAC device 310 transmits the WPS message M1 and receives the WPS message M2 from the RAS device 340 to exchange a public key therebetween and authenticate each other and generate a temporal encryption key.

In operations 314 through 317 and 319, the RAC device 310 and the RAS device 340 exchange the WPS messages M1 through M7, and authenticate whether the PIN values are identical to each other, enabling the RAC device 310 and the RAS device 340 to authenticate each other.

In operation 318, the RAC device 310 generates a credential and a credential ID using the PIN information. The management console device 360 needs the RATA capability information and the credential ID of the RAC device 310 so as to generate a RATA profile. Thus, the RAC device 310 generates the credential using the PIN information and the credential ID with regard to the generated credential.

In operation 319, the RAC device 310 generates the WPS message M7 including the credential ID and the RATA capability information and transmits the WPS message M7 to the RAS device 340.

In operation 320, the management console device 360 receives an event message from the RAS device 340 that subscribes an event in advance (operation 361) indicting that the RAS device 340 receives the credential ID and the RATA capability information of the RAC device 310.

In operations 321 and 322, the management console device 360 receives the credential ID and the RATA capability information of the RAC device 310 through a UPnP action.

In operation 323, the management console device 360 matches protocols and capability information that are to be used by RATAs of the RAS device 340 and the RAC device 310, generates each RATA profile with regard to the RAS device 340 and the RAC device 310 based on the matching information, and transmits the RATA profiles to the RAS device 340 through the UPnP action.

In operation 324, the RAS device 340 establishes the RATA profile therein.

In operation 325, the RAC device 310 receives the WPS message M8 including the RATA profile with regard to the RAC device 310 from the RAS device 340.

In operation 326, the RAC device 310 establishes the RATA profile therein and establishes a RATC between the RAS device 340 and the RAC device 310 using the RATA profile.

In the present embodiment, the RATA profile may be dynamically provided to the RAC device 310 of the remote network that does not establish the RATA profile in advance in the home network including the RAS device 340 and the management console device 360. Therefore, the RAC device 310 receives only the PIN information and URL information of the RAS device 340 from the outside, thereby enabling an easy remote access channel setup.

Also, in the present embodiment, a WPS protocol that is used in the same physical network is extended to an IP layer protocol (for example, a RADIUS), so that devices of physically different networks can use the WPS protocol.

Figure 4:
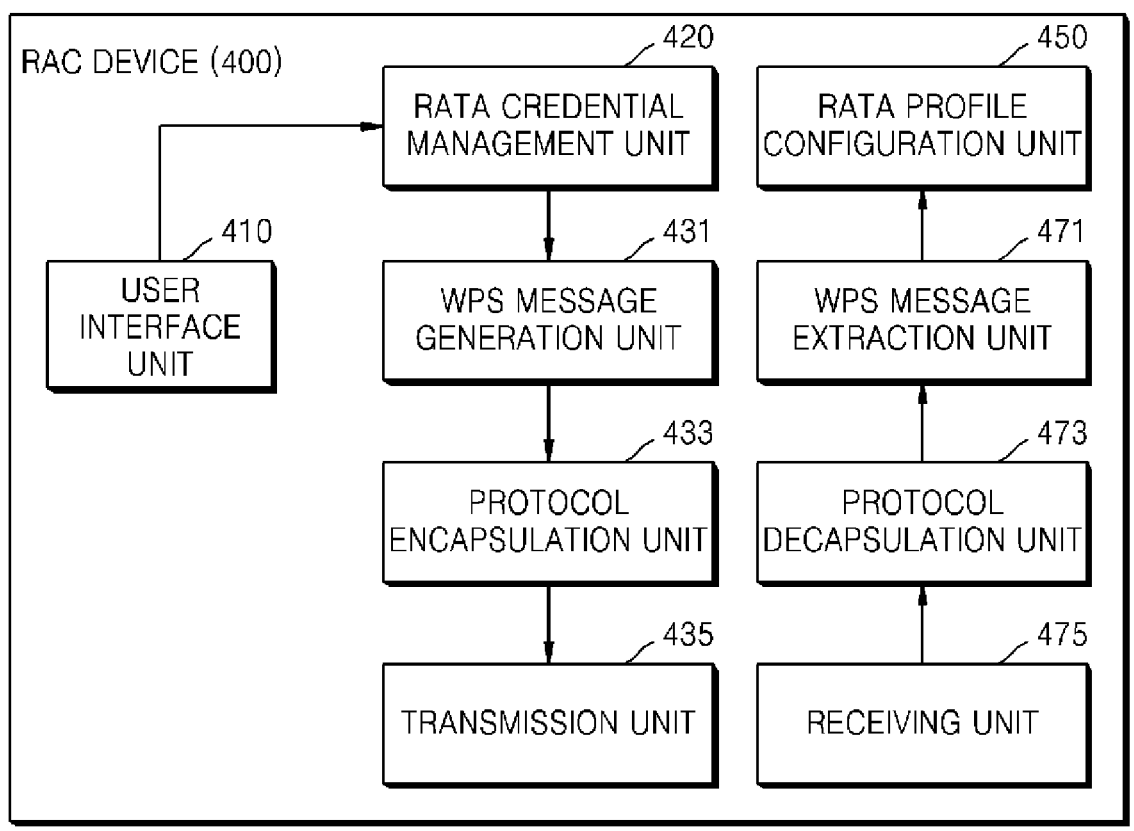
FIG. 4 is a block diagram of a RAC device according to an embodiment of the present invention.

FIG. 4 is a block diagram of a RAC device 400 according to an embodiment of the present invention. Referring to FIG. 4, the RAC device 400 comprises a user interface unit 410, a RATA credential management unit 420, a WPS message generation unit 431, a protocol encapsulation unit 433, a transmission unit 435, a RATA profile configuration unit 450, a WPS message extraction unit 471, a protocol decapsulation unit 473, and a receiving unit 475.

The user interface unit 410 receives PIN information that is an identifier provided to an RAS device when manufactured and a URL of the RAS device from the outside.

The RATA credential management unit 420 comprises a credential generating unit (not shown) that generates a credential using the PIN information and a credential ID determining unit (not shown) that determines a credential ID of the generated credential.

The WPS message generation unit 431 generates WPS messages including the credential ID and RATA capability information. The protocol encapsulation unit 433 encapsulates an EAP packet generated by using the WPS messages in an IP based application protocol. A RADIUS protocol may be the IP based application protocol packet. The transmission unit 435 transmits the IP based application protocol packet to the RAS device.

The receiving unit 475 receives the IP based application protocol packet including the RATA profile for remote access with regard to the RAC device 400. The protocol decapsulation unit 473 decapsulates from the received IP based application protocol packet, the EAP packet. The WPS message extraction unit 471 extracts the WPS messages including the RATA profile for the remote access from the EAP packet.

The RATA profile configuration unit 450 establishes the RATA profile for the remote access in the RAC device 400. Thereafter, the RAC device 400 establishes a RATC With the RAS device using the RATA profile.

Figure 5:
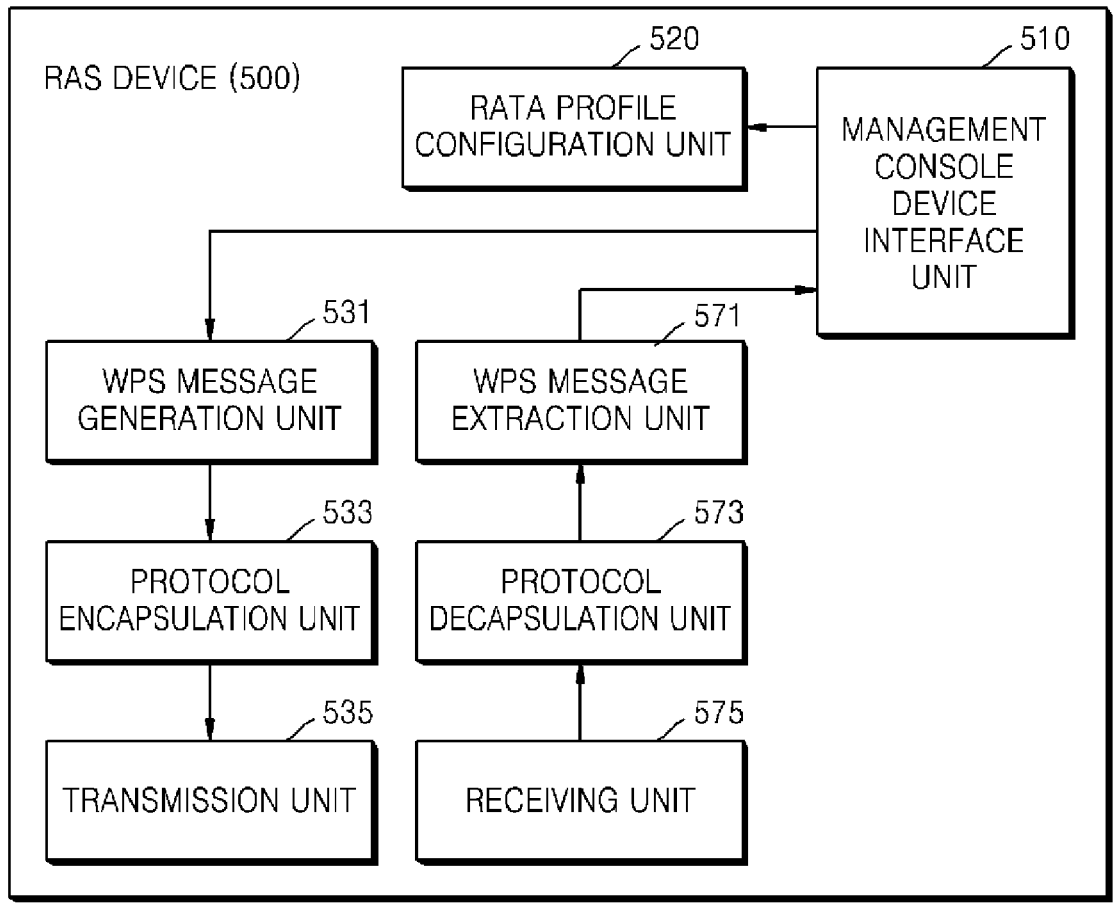
FIG. 5 is a block diagram of a RAS device according to an embodiment of the present invention.

FIG. 5 is a block diagram of a RAS device 500 according to an embodiment of the present invention. Referring to FIG. 5, the RAS device 500 comprises a management console device interface unit 510, a RATA profile configuration unit 520, a WPS message generation unit 531, a protocol encapsulation unit 533, a transmission unit 535, a WPS message extraction unit 571, a protocol decapsulation unit 573, and a receiving unit 575.

The receiving unit 575 receives an IP based application protocol packet including a credential ID and RATA capability information from a RAC device. The protocol decapsulation unit 573 decapsulates from the received IP based application protocol packet, an EAP packet. A RADIUS protocol may be the IP based application protocol. The WPS message extraction unit 571 extracts WPS messages including the credential ID and the RATA capability information for the remote access from the EAP packet.

The management console device interface unit 510 comprises a management console device transmission interfacing unit (not shown) that transmits the credential ID and the RATA capability information to a management console device that subscribes to an event in advance and a management console device receiving interfacing unit (not shown) that receives RATA profiles with regard to the RAC device and the RAS device 500 from the management console device.

The RATA profile configuration unit 520 establishes the RATA profiles with regard to the RAS device 500 in the RAS device 500.

The WPS message generation unit 531 generates WPS messages including the RATA profile with regard to the RAC device. The protocol encapsulation unit 533 encapsulates the EAP packet generated by using the WPS messages as the IP based application protocol packet. The transmission unit 535 transmits the IP based application protocol packet to the RAC device.

Figure 6:
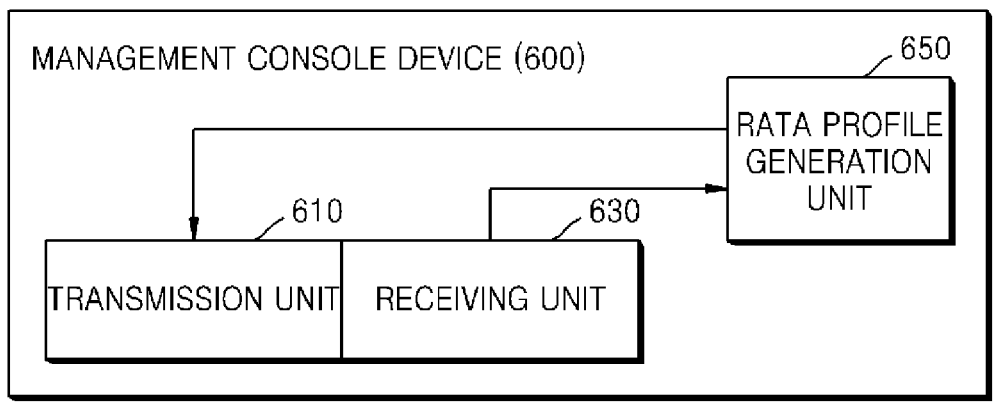
FIG. 6 is a block diagram of a management console device according to an embodiment of the present invention.

FIG. 6 is a block diagram of a management console device 600 according to an embodiment of the present invention. Referring to FIG. 6, the management console device 600 comprises a transmitting unit 610, a receiving unit 630, and a RATA profile generation unit 650. The receiving unit 630 receives a credential ID and RATA capability information of an RAC device from a RAS device that subscribes an event in advance. The RATA profile generation unit 650 generates RATA profiles with regard to the RAC device and the RAS device. The transmitting unit 610 transmits the RATA profiles with regard to the RAC device and the RAS device to the RAS device.

Meanwhile, the management console device 600 may be physically separate from or may be included in the RAS device.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs). In other exemplary embodiments, the medium may include transmission media such as media carrying or including carrier waves, as well as elements of the Internet. Thus, the medium may be such a defined and measurable structure including or carrying a signal or information, such as a device carrying a bitstream according to embodiments of the present invention.

While aspects of the present invention have been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those of ordinary skill in the art that changes may be made in these embodiments without departing from the principles and spirit of the invention, the scope of which is defined in the claims and their equivalents.

What is claimed is:

1. A communication computer implemented method of a universal plug and play (UPnP) remote access client (RAC) device for providing a remote access service, the method comprising:
   receiving product identification number (PIN) information that is an identifier provided to a remote access server (RAS) device when manufactured and a uniform resource locator (URL) of the RAS device from the outside;
   generating WiFi protected setup (WPS) messages including a credential ID and remote access transport agent (RATA) capability information, which are generated based on the PIN information;
   encapsulating an extensible authentication protocol (EAP) packet including the WPS messages in an IP based application protocol packet;
   transmitting the IP based application protocol packet to the RAS device;
   receiving the IP based application protocol packet including RATA profiles for remote access:
   decapsulating the EAP packet from the received IP based application protocol packet;
   extracting the WPS messages including the RATA profiles for remote access from the EAP packet; and
   establishing the RATA profiles for the remote access in the RAS device.

2. The method of claim 1, wherein the IP based application protocol is a remote authentication dial-in user service (RADIUS) protocol.

3. The method of claim 1, further comprising:
   generating a credential by using the PIN information; and
   determining a credential ID of the generated credential.

4. A communication computer implemented method of a universal plug and play (UPnP) remote access server (RAS) device for providing a remote access service, the method comprising:
   receiving an IP based application protocol packet including a credential ID and remote access transport agent (RATA) capability information from a remote access client (RAC) device;
   decapsulating an extensible authentication protocol (EAP) packet from the received IP based application protocol packet;
   extracting WiFi protected setup (WPS) messages including the credential ID and the RATA capability information from the EAP packet;
   transmitting the credential ID and the RATA capability information to a management console device that subscribes to an event in advance;
   receiving RATA profiles with regard to the RAC device and the RAS device from the management console device; and
   establishing the RATA profiles with regard to the RAS device in the RAS device,
   generating WPS messages including the RATA profiles with regard to the RAC device;
   encapsulating the EAP packet including the WPS messages in the IP based application protocol packet; and
   transmitting the IP based application protocol packet to the RAC device.

5. The method of claim 4, wherein the IP based application protocol is a remote authentication dial-in user service (RADIUS) protocol.

6. A communication computer implemented method of a management console device for providing a remote access service, the method comprising:
   receiving a credential ID and remote access transport agent (RATA) capability information of a remote access client (RAC) device from a remote access server (RAS) device that subscribes to an event in advance;
   generating remote access transport agent (RATA) profiles with regard to the RAC device and the RAS device;
   transmitting the RATA profiles with regard to the RAC device and the RAS device to the RAS device,
   receiving the IP based application protocol packet including RATA profiles for remote access:
   decapsulating the EAP packet from the received IP based application protocol packet;
   extracting the WPS messages including the RATA profiles for remote access from the EAP packet; and
   establishing the RATA profiles for the remote access in the RAS device.

7. The method of claim 6, wherein the management console device is separated from or is included in the RAS device.

8. A universal plug and play (UPnP) remote access client (RAC) device for providing a remote access service, the device comprising:
   a user interfacing unit which receives product identification number (PIN) information that is an identifier provided to a remote access server (RAS) device when manufactured and a URL of the RAS device from the outside;
   a WiFi protected setup (WPS) message generating unit which generates WPS messages including a credential ID and remote access transport agent (RATA) capability information, which are generated based on the PIN information;
   a protocol encapsulation unit which encapsulates an extensible authentication protocol (EAP) packet including the WPS messages as an IP based application protocol packet;
   a transmission unit which transmits the IP based application protocol packet to the RAS device,
   a receiving unit which receives the IP based application protocol packet including RATA profiles for remote access;
   a protocol decapsulating unit which decapsulates the EAP packet from the received IP based application protocol packet;
   a WPS message extracting unit which extracts the WPS messages including the RATA profiles for the remote access from the EAP packet; and
   a RATA profile configuring unit which establishes the RATA profiles for the remote access in the RAS device.

9. The device of claim 8, wherein the IP based application protocol is a remote authentication dial-in user service (RADIUS) protocol.

10. The device of claim 8, further comprising a RATA credential managing unit comprising:

a credential generating unit which generates a credential by using the PIN information; and a credential ID determining unit which determines a credential ID of the generated credential.

11. A universal plug and play (UPnP) remote access server (RAS) device for providing a remote access service, the device comprising:

a receiving unit which receives an IP based application protocol packet including a credential ID and remote access transport agent (RATA) capability information from a remote access client (RAC) device;

a protocol decapsulating unit which decapsulates an extensible authentication protocol (EAP) packet from the received IP based application protocol packet;

a WiFi protected setup (WPS) message extracting unit which extracts WPS messages including the credential ID and the RATA capability information from the EAP packet;

a management console device transmission interfacing unit which transmits the credential ID and the RATA capability information to a management console device that subscribes to an event in advance, a management console device receiving interfacing unit which receives RATA profiles with regard to the RAC device and the RAS device from the management console device;

a RATA profile configuring unit which establishes the RATA profiles with regard to the RAS device in the RAS device;

a WPS message generating unit which generates WPS messages including the RATA profile with regard to the RAC device;

a protocol encapsulating unit which encapsulates the EAP packet including the WPS messages in the IP based application protocol packet; and a transmitting unit which transmits the IP based application protocol packet to the RAC device.

12. The device of claim 11, wherein the IP based application protocol is a remote authentication dial-in user service (RADIUS) protocol.

13. A management console device for providing a remote access service, the device comprising:

a receiving unit which receives a credential ID and remote access transport agent (RATA) capability information of a remote access client (RAC) device from a remote access server (RAS) device that subscribes to an event in advance;

a RATA profile generating unit which generates RATA profiles with regard to the RAC device and the RAS device;

a transmitting unit which transmits the RATA profiles with regard to the RAC device and the RAS device to the RAS device, a receiving unit which receives the IP based application protocol packet including RATA profiles for remote access;

a protocol decapsulating unit which decapsulates the EAP packet from the received IP based application protocol packet;

a WPS message extracting unit which extracts the WPS messages including the RATA profiles for the remote access from the EAP packet; and a RATA profile configuring unit which establishes the RATA profiles for the remote access in the RAS device.

14. The device of claim 13, wherein the management console device is separate from or is included in the RAS device.

15. A non-transitory computer-readable recording medium having recorded thereon a computer program for executing the method of claim 1.

16. A non-transitory computer-readable recording medium having recorded thereon a computer program for executing the method of claim 4.

17. A non-transitory computer-readable recording medium having recorded thereon a computer program for executing the method of claim 6.

* * * * *